US012802870B2

(12) United States Patent
Chen et al.

(10) Patent No.: US 12,802,870 B2
(45) Date of Patent: Nov. 17, 2026

(54) INTEGRATED MAGNETIC COMPONENT AND MAGNETIC CORE STRUCTURE THEREOF

(71) Applicant: LITE-ON Technology Corporation, Taipei City (TW)

(72) Inventors: Kai-De Chen, Taipei City (TW); Yong-Long Syu, Taipei City (TW); Chen Chen, Taipei City (TW)

(73) Assignee: LITE-ON Technology Corporation, Taipei (TW)

( * ) Notice: Subject to any disclaimer, the term of this patent is extended or adjusted under 35 U.S.C. 154(b) by 537 days.

(21) Appl. No.: 18/530,253

(22) Filed: Dec. 6, 2023

(65) Prior Publication Data

US 2025/0111986 A1 Apr. 3, 2025

(30) Foreign Application Priority Data

Sep. 28, 2023 (TW) ................................ 112137464

(51) Int. Cl.
*H01F 27/30* (2006.01)
*H01F 27/24* (2006.01)

(52) U.S. Cl.
CPC ........... *H01F 27/306* (2013.01); *H01F 27/24* (2013.01)

(58) Field of Classification Search
CPC ..................................................... H01F 27/306
USPC .......................................................... 336/212
See application file for complete search history.

(56) References Cited

U.S. PATENT DOCUMENTS 5,168,440 A * 12/1992 Spreen ................ H01F 27/2847 363/126
6,873,237 B2 * 3/2005 Chandrasekaran ... H02M 7/043 336/215
6,972,657 B1 * 12/2005 Pacala ................ H01F 27/2866 336/200
8,079,134 B2 * 12/2011 Maki .................. H01F 17/0013 427/116
8,536,971 B1 * 9/2013 Waseem .................. H01F 38/42 336/212
10,074,474 B2 * 9/2018 Harrison ............. H01F 27/2804
10,847,297 B1 * 11/2020 Hsu ...................... H01F 27/006
11,705,266 B2 * 7/2023 Rottner .................. H01F 17/04 336/212

(Continued)

*Primary Examiner* — Ronald Hinson

(57) ABSTRACT

Disclosed is a magnetic core structure including a bottom plate with a first surface, a first transformer magnetic column, a second transformer magnetic column, an inductor magnetic column and a first magnetic column. The first transformer magnetic column, the second transformer magnetic column, the inductor magnetic column and the first magnetic column are disposed on the first surface. The second transformer magnetic column and the first transformer magnetic column are spaced apart along a first direction. The inductor magnetic column is spaced apart from the first transformer magnetic column and the second transformer magnetic column along a second direction perpendicular to the first direction. The first magnetic column is located among the first transformer magnetic column, the second transformer magnetic column and the inductor magnetic column. The first magnetic column includes three side walls facing the first transformer magnetic column, the second transformer magnetic column and the inductor magnetic column.

20 Claims, 9 Drawing Sheets

(56) References Cited

U.S. PATENT DOCUMENTS

| | | | | |
|---|---|---|---|---|
| 11,728,087 | B2 * | 8/2023 | Yang | H01F 3/14 336/170 |
| 2005/0024179 | A1 * | 2/2005 | Chandrasekaran | H01F 27/24 336/212 |
| 2009/0289751 | A1 * | 11/2009 | Nagano | H02M 3/1584 336/221 |
| 2012/0056704 | A1 * | 3/2012 | Nagano | H01F 27/366 336/212 |
| 2013/0057164 | A1 * | 3/2013 | Gruber | H01F 27/2804 336/182 |
| 2014/0266530 | A1 * | 9/2014 | Andres | H01F 27/306 336/170 |
| 2014/0340940 | A1 * | 11/2014 | Ouyang | H01F 27/28 336/170 |
| 2015/0200047 | A1 * | 7/2015 | Kim | H01F 27/2804 336/212 |
| 2017/0149407 | A1 * | 5/2017 | Hsu | H01F 27/292 |
| 2018/0308615 | A1 * | 10/2018 | Tsai | H01F 27/24 |
| 2019/0019610 | A1 * | 1/2019 | Lu | H02M 7/043 |
| 2019/0362885 | A1 * | 11/2019 | Lu | H01F 27/29 |
| 2020/0350117 | A1 * | 11/2020 | Nabih | H01F 27/24 |
| 2020/0395164 | A1 * | 12/2020 | Ahmed | H01F 27/2804 |
| 2023/0092009 | A1 * | 3/2023 | Sun | B60L 53/22 336/210 |
| 2023/0197330 | A1 * | 6/2023 | Ebner | H01F 17/043 336/65 |
| 2023/0260692 | A1 * | 8/2023 | Gul | H01F 27/306 336/220 |

* cited by examiner

INTEGRATED MAGNETIC COMPONENT AND MAGNETIC CORE STRUCTURE THEREOF

CROSS REFERENCE TO RELATED PRESENT DISCLOSURE

This application claims the priority benefit of Taiwan Patent Application Serial Number 112137464, filed on Sep. 28, 2023, the full disclosure of which is incorporated herein by reference.

BACKGROUND

Technical Field

The present disclosure relates to an integrated magnetic component and a magnetic core structure thereof, in particular to an integrated magnetic component and a magnetic core structure thereof that can reduce the overall size.

Related Art

The existing resonant converter includes a square wave generating circuit, a resonant circuit and a rectifier circuit. The square wave generating circuit is used to output a square wave signal to the resonant circuit according to an input voltage. The resonant circuit is used to generate a divided voltage signal according to the square wave signal. The rectifier circuit is used to rectify the divided voltage signal to obtain an output voltage. The resonant circuit includes an inductor element and a transformer, and the inductor element and the transformer are arranged separately.

However, since the inductor element and the transformer are arranged separately, it is not conducive to the miniaturization of the resonant converter/resonant circuit, and also affect the installation space of other electronic components. Therefore, how to integrate the inductive element(s) and transformer(s) to provide a smaller magnetic core structure, which can integrate the functions of the inductor element(s) and transformer(s) when applied to an integrated magnetic component, and achieve miniaturization of the resonant converter/resonant circuit in accordance with the current miniaturization development trend, has become one of the important topics.

SUMMARY

Embodiments of the present disclosure provide an integrated magnetic component and a magnetic core structure thereof, which can solve the problem that the existing resonant circuit takes up too much space due to the separate arrangement of the inductor element and the transformer, which is not conducive to the development trend of miniaturization.

In order to solve the above technical problem, the present disclosure is implemented as follows.

The present disclosure provides a magnetic core structure, which includes a bottom plate, a first transformer magnetic column, a second transformer magnetic column, an inductor magnetic column and a first magnetic column. The bottom plate includes a first surface. The first transformer magnetic column, the second transformer magnetic column, the inductor magnetic column and the first magnetic column are disposed on the first surface. The second transformer magnetic column and the first transformer magnetic column are spaced apart from each other along a first direction. The inductor magnetic column is spaced apart from the first transformer magnetic column and the second transformer magnetic column along a second direction perpendicular to the first direction. The first magnetic column is located among the first transformer magnetic column, the second transformer magnetic column and the inductor magnetic column. The first magnetic column includes three side walls facing the first transformer magnetic column, the second transformer magnetic column and the inductor magnetic column respectively.

The present disclosure further provides an integrated magnetic component, which includes the magnetic core structure of the present disclosure, a first transformer winding, a second transformer winding and an inductor winding. The first transformer winding is wound around the first transformer magnetic column, the second transformer winding is wound around the second transformer magnetic column, and the inductor winding is wound around the inductor magnetic column. The first transformer magnetic column, the second transformer magnetic column, the first transformer winding and the second transformer winding constitute a primary side structure of a transformer, and the inductor magnetic column and the inductor winding constitute an inductor element.

In the embodiments of the present disclosure, through the relative position arrangement of the first transformer magnetic column, the second transformer magnetic column, the inductor magnetic column and the first magnetic column on the first surface, and the structural design of the first magnetic column (that is, the first magnetic column includes three side walls facing the first transformer magnetic column, the second transformer magnetic column and the inductor magnetic column respectively), the magnetic cores of the inductor element and the transformer are integrated, so that the volume of the magnetic core structure of the present disclosure is smaller than that of the magnetic cores of the inductor element and the transformer arranged separately, which is in accordance with the current miniaturization development trend. In addition, when the magnetic core structure of the present disclosure is applied to an integrated magnetic component, the integrated magnetic component can integrate the functions of an inductor element and a transformer.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the FIG.s, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

In addition, although terms "first", "second", "third" and the like are used to describe different components in the present disclosure, they are only used to distinguish components or operations described with the same technical terms.

Figure 1:
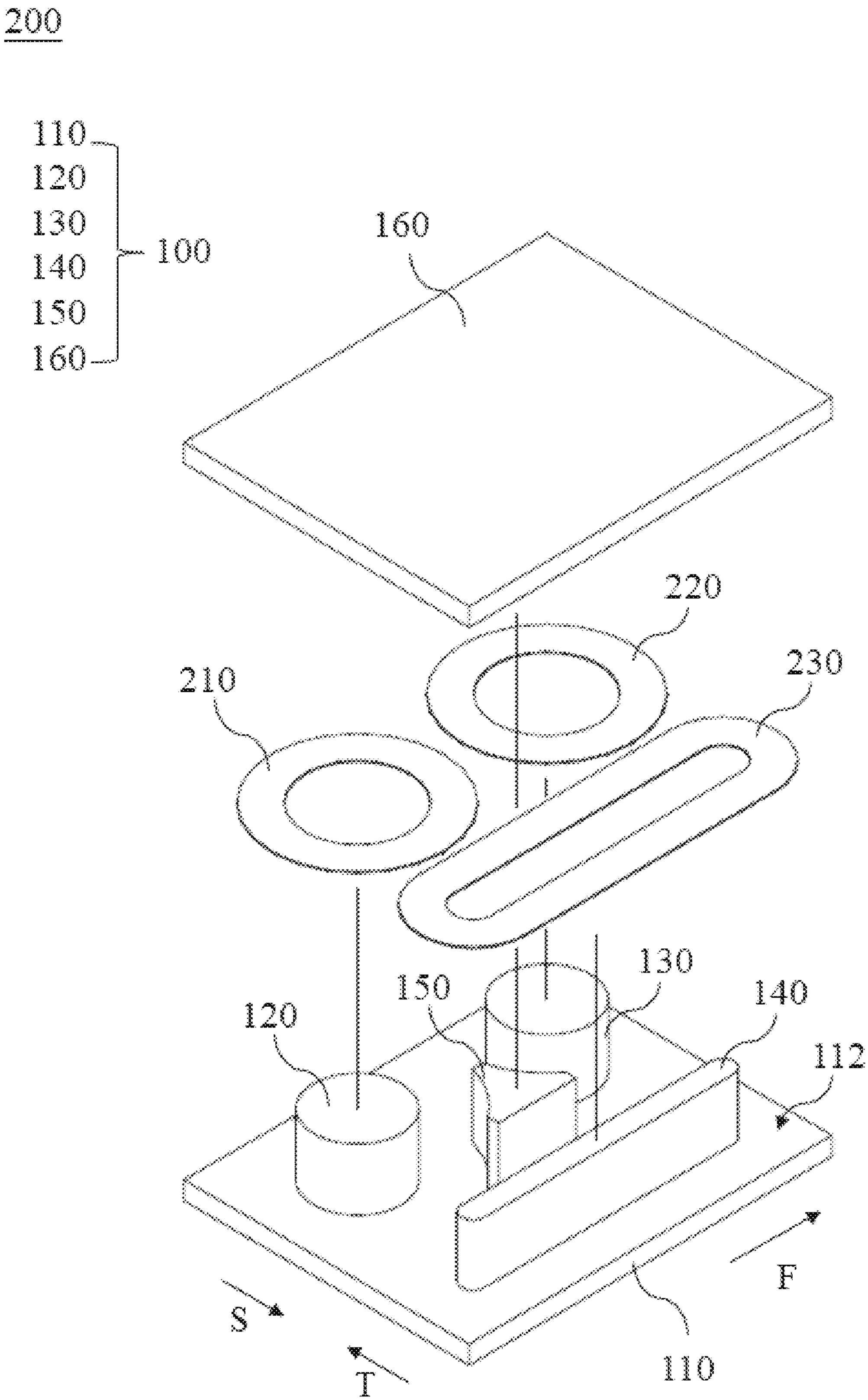
FIG. 1 is an exploded schematic structural view of an embodiment of an integrated magnetic component using a magnetic core structure of a first embodiment of the present disclosure.
Figure 2:
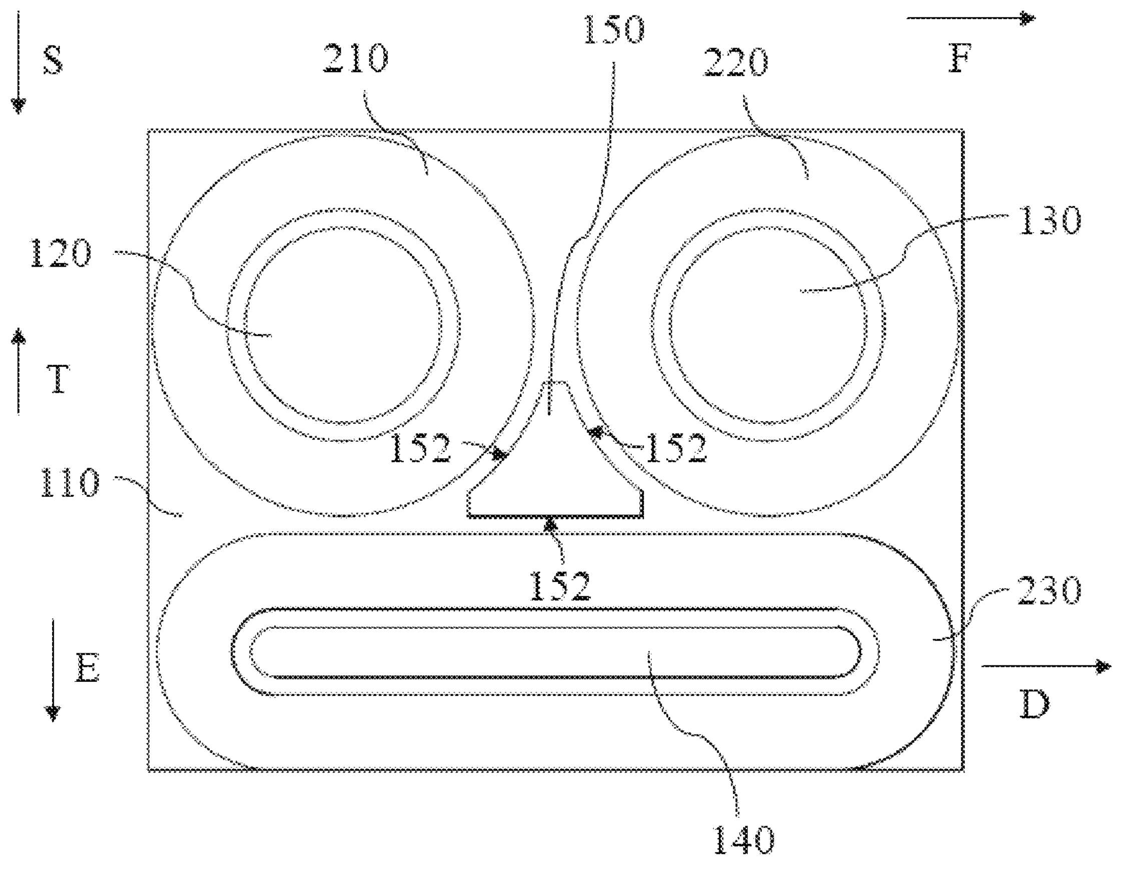
FIG. 2 is a top view of the assembly of the bottom plate, the first transformer magnetic column, the second transformer magnetic column, the inductor magnetic column, the first magnetic column, the first transformer winding, the second transformer winding and the inductor winding of FIG. 1.
Figure 14:
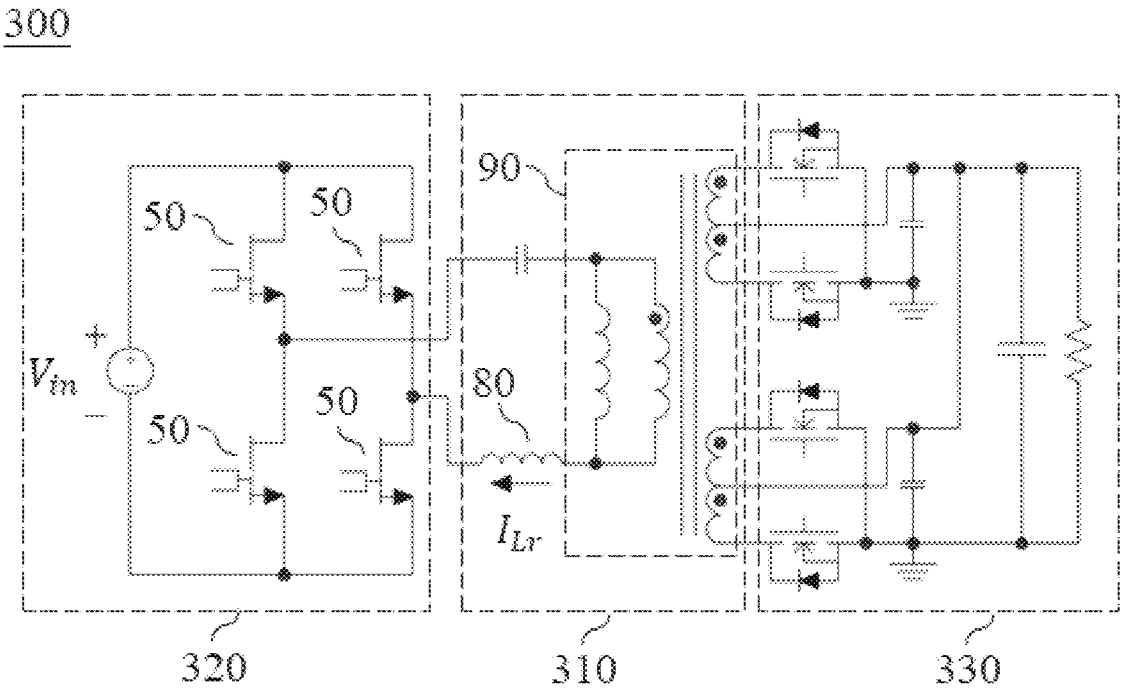
FIG. 14 is a schematic circuit diagram of an embodiment of a resonant converter using the integrated magnetic component of the present disclosure.
Figure 15:
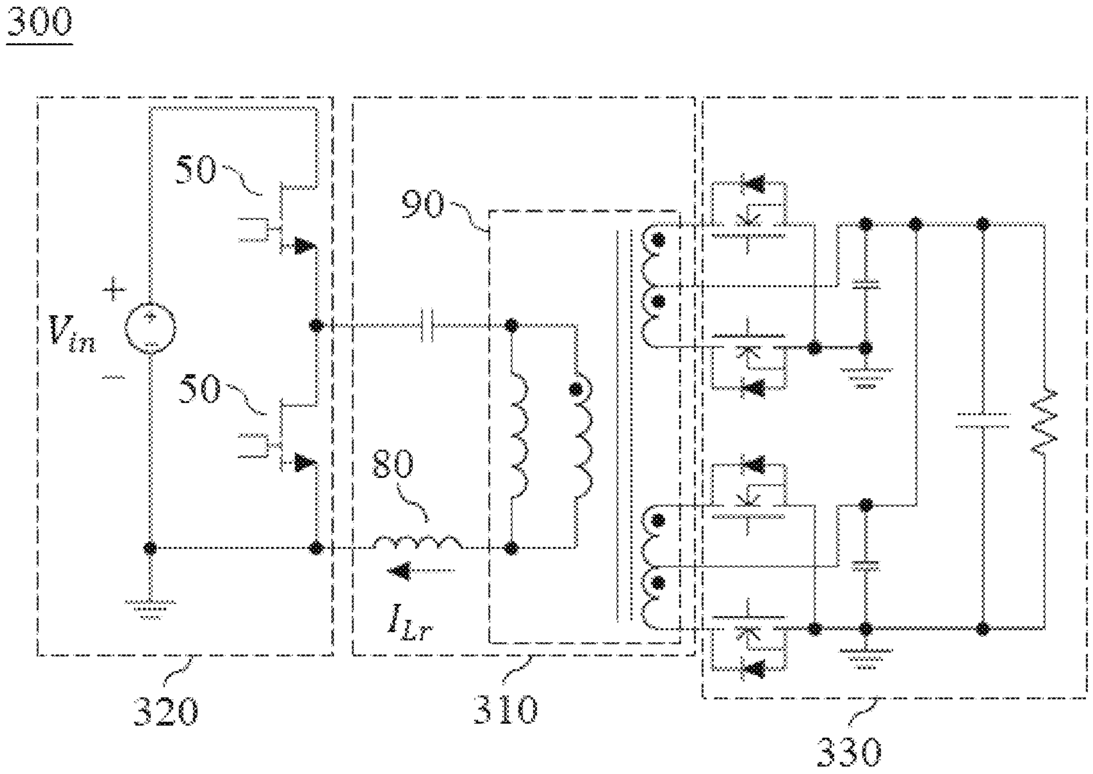
FIG. 15 is a schematic circuit diagram of another embodiment of a resonant converter using the integrated magnetic component of the present disclosure.

Please refer to FIG. 1 and FIG. 2, wherein FIG. 1 is an exploded schematic structural view of an embodiment of an integrated magnetic component using a magnetic core structure of a first embodiment of the present disclosure, and FIG. 2 is a top view of the assembly of the bottom plate, the first transformer magnetic column, the second transformer magnetic column, the inductor magnetic column, the first magnetic column, the first transformer winding, the second transformer winding and the inductor winding of FIG. 1. As shown in FIG. 1 and FIG. 2, an integrated magnetic component 200 comprises a magnetic core structure 100, a first transformer winding 210, a second transformer winding 220 and an inductor winding 230. The magnetic core structure 100 comprises a bottom plate 110, a first transformer magnetic column 120, a second transformer magnetic column 130, an inductor magnetic column 140 and a first magnetic column 150. The bottom plate 110 comprises a first surface 112. The first transformer magnetic column 120, the second transformer magnetic column 130, the inductor magnetic column 140 and the first magnetic column 150 are disposed on the first surface 112. The second transformer magnetic column 130 and the first transformer magnetic column 120 are spaced apart from each other along a first direction F. The inductor magnetic column 140 is spaced apart from the first transformer magnetic column 120 and the second transformer magnetic column 130 along a second direction S perpendicular to the first direction F. The first magnetic column 150 is located among the first transformer magnetic column 120, the second transformer magnetic column 130 and the inductor magnetic column 140. The first magnetic column 150 comprises three side walls 152 facing the first transformer magnetic column 120, the second transformer magnetic column 130 and the inductor magnetic column 140 respectively. The first transformer winding 210 is wound around the first transformer magnetic column 120, the second transformer winding 220 is wound around the second transformer magnetic column 130, and the inductor winding 230 is wound around the inductor magnetic column 140. The first transformer magnetic column 120, the second transformer magnetic column 130, the first transformer winding 210 and the second transformer winding 220 constitute a primary side structure of a transformer 90 (that is, the first transformer winding 210 and the second transformer winding 220 constitute a primary side winding of the transformer 90), the inductor magnetic column 140 and the inductor winding 230 constitute an inductor element 80, as shown in FIG. 14 and FIG. 15, wherein FIG. 14 is a schematic circuit diagram of an embodiment of a resonant converter using the integrated magnetic component of the present disclosure, and FIG. 15 is a schematic circuit diagram of another embodiment of a resonant converter using the integrated magnetic component of the present disclosure.

Through the relative position arrangement of the first transformer magnetic column 120, the second transformer magnetic column 130, the inductor magnetic column 140 and the first magnetic column 150 on the first surface 112, and the structural design of the first magnetic column 150, the magnetic cores of the inductor element 80 and the transformer 90 are integrated, so that the volume of the magnetic core structure 100 is smaller than that of the magnetic cores of the inductor element and the transformer arranged separately, which is in accordance with the current miniaturization development trend. In addition, the integrated magnetic component 200 integrates the functions of the inductor element 80 and the transformer 90.

The first transformer magnetic column 120, the second transformer magnetic column 130, the inductor magnetic column 140, the first magnetic column 150 and the bottom plate 110 can be, but are not limited to, integrally formed, or prepared separately and then bonded to each other through a magnetic colloid. The magnetic colloid may be made of a magnetic powder material mixed into a resin material. The resin material can be selected from one of polyphenylene sulfide (PPS), polybutylene terephthalate (PBT) or ethylene-ethyl acrylate copolymer (EEA), and the magnetic powder material may be a metal soft magnetic material or ferrite powder, and the metal soft magnetic material may be selected from one of iron powder, iron-aluminum-silicon alloy, iron-chromium-silicon alloy and stainless steel.

In addition, the materials of the first transformer magnetic column 120, the second transformer magnetic column 130, the inductor magnetic column 140, the first magnetic column 150 and the bottom plate 110 comprise, but not limited to, iron-silicon-aluminum alloy, iron-based alloy, iron-nickel alloy with the high magnetic flux density, iron-nickel-molybdenum alloy, nickel-zinc alloy or nanocrystalline alloy. The first transformer winding 210, the second transformer winding 220 and the inductor winding 230 may be, but not limited to, PCB windings or copper sheet windings.

Besides, the section shapes of the first transformer magnetic column 120 and the second transformer magnetic column 130 may be, but not limited to, circular, elliptical, semicircular, polygonal, square or other shapes, and the section shape of the inductor magnetic column 140 may be, but not limited to, circular, elliptical, semicircular, polygonal, square, long strip or other shapes. The three side walls 152 of the first magnetic column 150 facing the first transformer magnetic column 120, the second transformer magnetic column 130 and the inductor magnetic column 140 respectively may be, but not limited to, flat surfaces, curved surfaces or arcuate surfaces. It should be noted that the section in the present disclosure refers to a cross section, not a longitudinal section or an oblique section, and the sectional center in the present disclosure refers to an intersection point between the midline of the longest side and the midline of the shortest side in the cross-sectional shape. In this embodiment, the section shapes of the first transformer magnetic column 120 and the second transformer magnetic column 130 may be circular shapes, and the section shape of the inductor magnetic column 140 may be a long strip shape.

Furthermore, the magnetic core structure 100 may further comprise a cover plate 160. The first transformer magnetic column 120, the second transformer magnetic column 130, the inductor magnetic column 140 and the first magnetic column 150 are arranged between the bottom plate 110 and the cover plate 160. The material of the cover plate 160 comprises, but not limited to, iron-silicon-aluminum alloy, iron-based alloy, iron-nickel alloy with high magnetic flux density, iron-nickel-molybdenum alloy, nickel-zinc alloy or nanocrystalline alloy. The cover plate 160 can be bonded to the first transformer magnetic column 120, the second transformer magnetic column 130, the inductor magnetic column 140 and the first magnetic column 150 through the magnetic colloid.

In one embodiment, the cross-sectional center line L1 connecting the first transformer magnetic column 120 and the second transformer magnetic column 130 is parallel to the long axis direction D of a section of the inductor magnetic column 140, wherein the cross-sectional center line L1 connecting the first transformer magnetic column 120 and the second transformer magnetic column 130 is a line connecting a sectional center of the first transformer magnetic column 120 and a sectional center of the second transformer magnetic column 130. The section of the inductor magnetic column 140 may be in a shape, such as an ellipse shape or a long strip shape, with a long axis direction D and a short axis direction E.

In one embodiment, the projection of the inductor magnetic column 140 in the direction opposite to the second direction S may overlap the first transformer magnetic column 120 and the second transformer magnetic column 130. The projection of the inductor magnetic column 140 in the direction opposite to the second direction S (i.e., the direction T) may partially or completely overlap the first transformer magnetic column 120 and the second transformer magnetic column 130.

In one embodiment, the sectional area of the first transformer magnetic column 120 is equal to the sectional area of the second transformer magnetic column 130, and the sectional area of the first magnetic column 150 is greater than or equal to 0.1 times the sectional area of the first magnetic column 150, and is less than or equal to 0.5 times the sectional area of the first magnetic column 150.

In one embodiment, a winding direction of the first transformer winding 210 is opposite to a winding direction of the second transformer winding 220. For example, the winding direction of the first transformer winding 210 is clockwise, and the winding direction of the second transformer winding 220 is counterclockwise; or the winding direction of the first transformer winding 210 is counterclockwise, and the winding direction of the second transformer winding 220 is clockwise. At this time, the winding direction of the inductor winding 230 may be clockwise or counterclockwise.

In one embodiment, the winding direction of the first transformer winding 210 is the same as the winding direction of the second transformer winding 220, and the winding direction of the inductor winding 230 is opposite to the winding direction of the second transformer winding 220. For example, the winding directions of the first transformer winding 210 and the second transformer winding 220 are both clockwise, and the winding direction of the inductor winding 230 is counterclockwise; or the winding directions of the first transformer winding 210 and the second transformer winding 220 are both counterclockwise, and the winding direction of the inductor winding 230 is clockwise.

It is worth noting that when the integrated magnetic component 200 of FIG. 1 operates on the condition that the winding directions of the first transformer winding 210 and the second transformer winding 220 are both clockwise, and the winding direction of the inductor winding 230 is counterclockwise, relative to the condition that the winding directions of the first transformer winding 210 and the inductor winding 230 are both clockwise, and the winding direction of the second transformer winding 220 is counterclockwise, the first magnetic column 150 has a smaller magnetic flux density, and the inductor magnetic column 140 has a higher magnetic flux density, resulting in higher entire iron loss. In addition, when the existing inductor element and transformer arranged separately have winding columns with the same cross-sectional area and the same winding area as the first transformer magnetic column 120, the entire iron loss of the existing inductor element and transformer arranged separately is higher than that of the integrated magnetic component 200 of FIG. 1.

Figure 3:
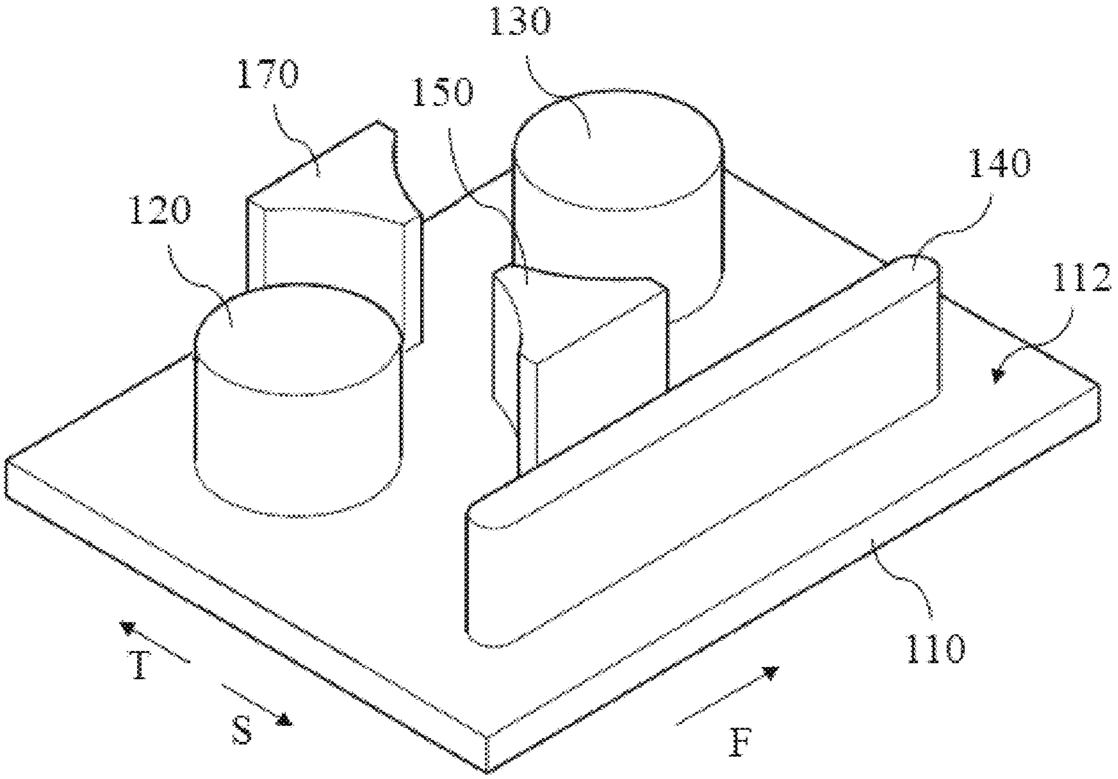
FIG. 3 is a perspective view of a magnetic core structure of a second embodiment of the present disclosure.
Figure 4:
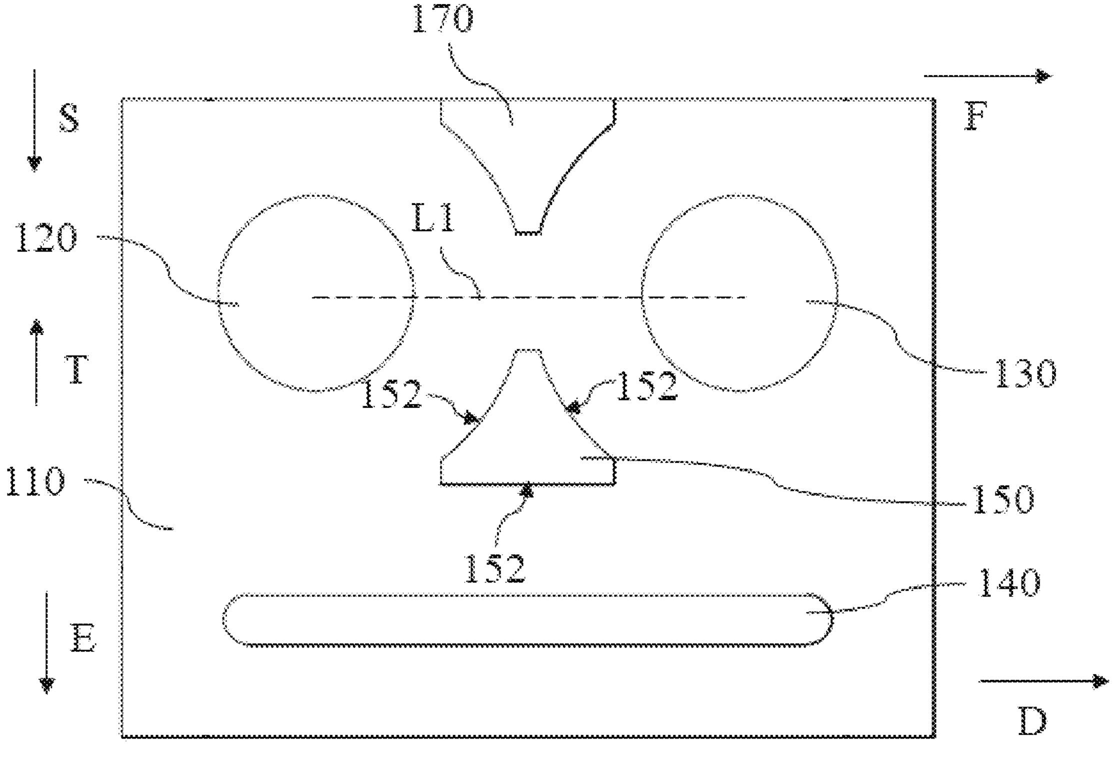
FIG. 4 is a top view of the magnetic core structure of FIG. 3.

Please refer to FIG. 3 and FIG. 4, wherein FIG. 3 is a perspective view of a magnetic core structure of a second embodiment of the present disclosure, and FIG. 4 is a top view of the magnetic core structure of FIG. 3. The difference between the magnetic core structure 100 of FIG. 3 and FIG. 4 and the magnetic core structure 100 of FIG. 1 and FIG. 2 is that the magnetic core structure 100 of FIG. 3 and FIG. 4 may further comprise a first side column 170, the first side column 170 is disposed on the first surface 112, and the first side column 170 and the first magnetic column 150 are arranged symmetrically with respect to the cross-sectional center line L1 connecting the first transformer magnetic column 120 and the second transformer magnetic column 130, wherein the cross-sectional center line L1 connecting the first transformer magnetic column 120 and the second transformer magnetic column 130 is a line connecting a sectional center of the first transformer magnetic column 120 and a sectional center of the second transformer magnetic column 130, the first side column 170 may comprise two side walls facing the first transformer magnetic column 120 and the second transformer magnetic column 130 and a side wall aligned with the side of the bottom plate 110, and the first side column 170 and the first magnetic column 150 are arranged in mirror symmetry with the cross-sectional center line L1 connecting the first transformer magnetic column 120 and the second transformer magnetic column 130 as a symmetry line.

Figure 5:
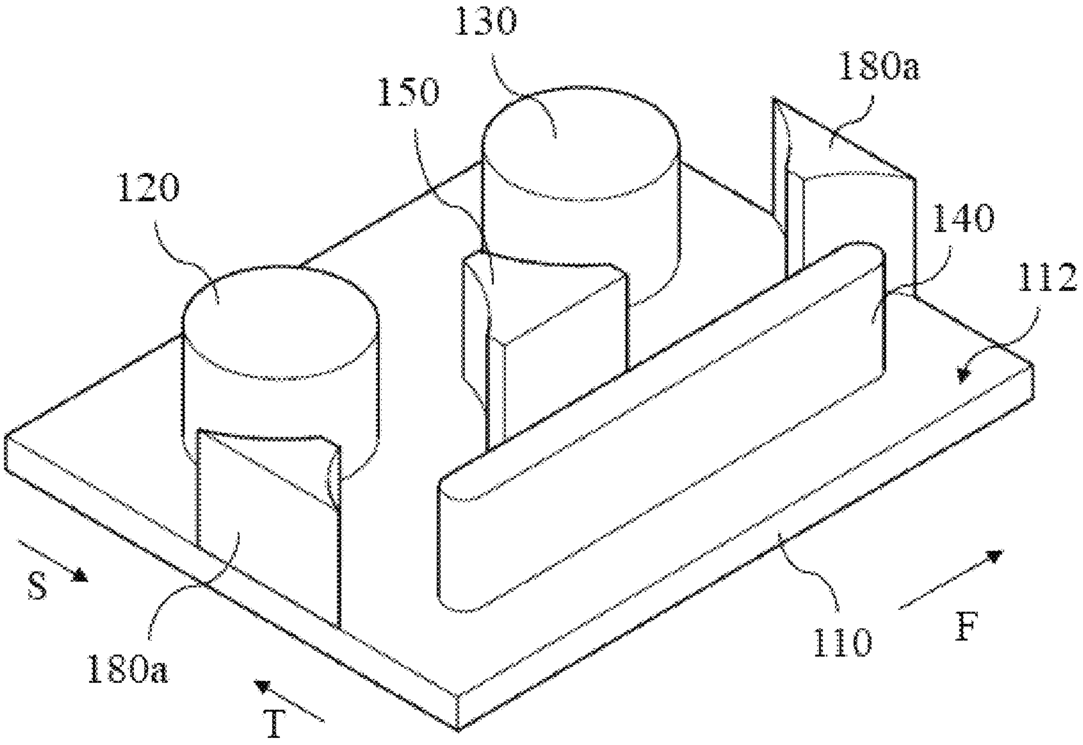
FIG. 5 is a perspective view of a magnetic core structure of a third embodiment of the present disclosure.
Figure 6:
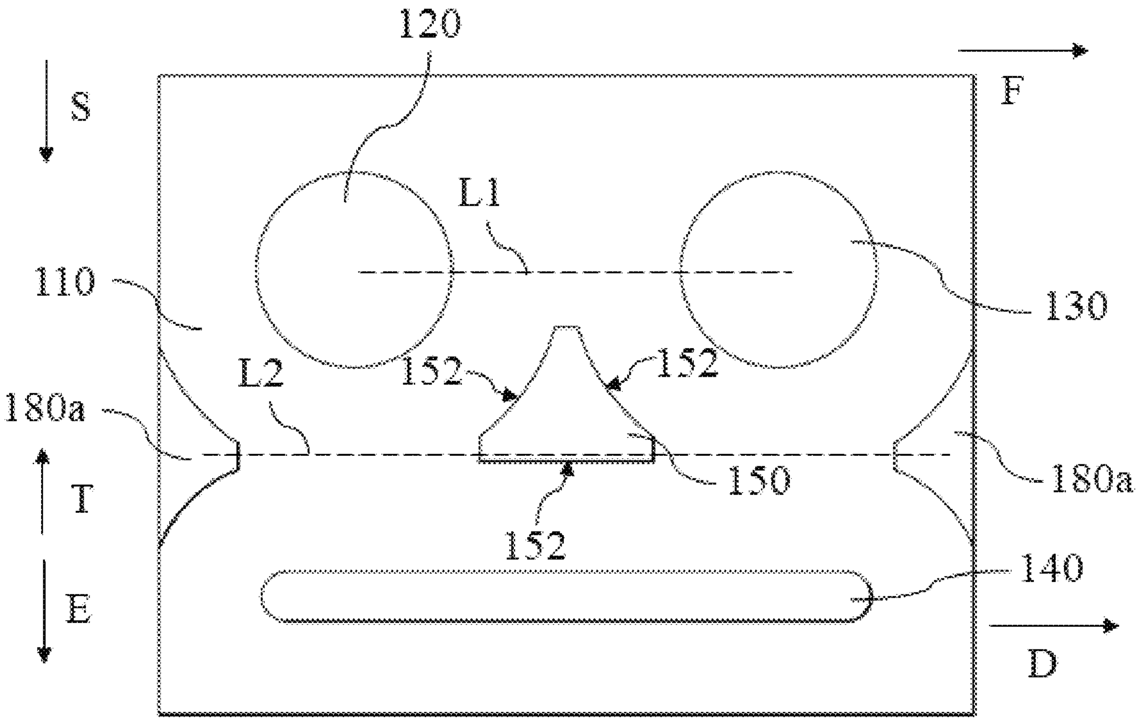
FIG. 6 is a top view of the magnetic core structure of FIG. 5.

Please refer to FIG. 5 and FIG. 6, wherein FIG. 5 is a perspective view of a magnetic core structure of a third embodiment of the present disclosure, and FIG. 6 is a top view of the magnetic core structure of FIG. 5. The difference between the magnetic core structure 100 of FIG. 5 and FIG. 6 and the magnetic core structure 100 of FIG. 1 is that the magnetic core structure 100 of FIG. 5 and FIG. 6 may further comprise two second side columns 180*a*, which are disposed on the first surface 112 and mirror-symmetrically arranged on opposite ends of the bottom plate 110 along the first direction F. One second side column 180*a* may comprise two side walls facing the first transformer magnetic column 120 and the inductor magnetic column 140 and one side wall aligned with one side of the bottom plate 110, and the other second side column 180*a* may comprise two side walls facing the second transformer magnetic column 130 and the inductor magnetic column 140 and one side wall aligned with the opposite side of the bottom plate 110.

In one embodiment, the cross-sectional center line L2 connecting the two second side columns 180*a* is parallel to the cross-sectional center line L1 connecting the first transformer magnetic column 120 and the second transformer magnetic column 130, wherein the cross-sectional center line L2 connecting the two second side columns 180*a* is a line connecting a sectional center of one second side column 180*a* and a sectional center of the other second side column 180*a*.

Figure 7:
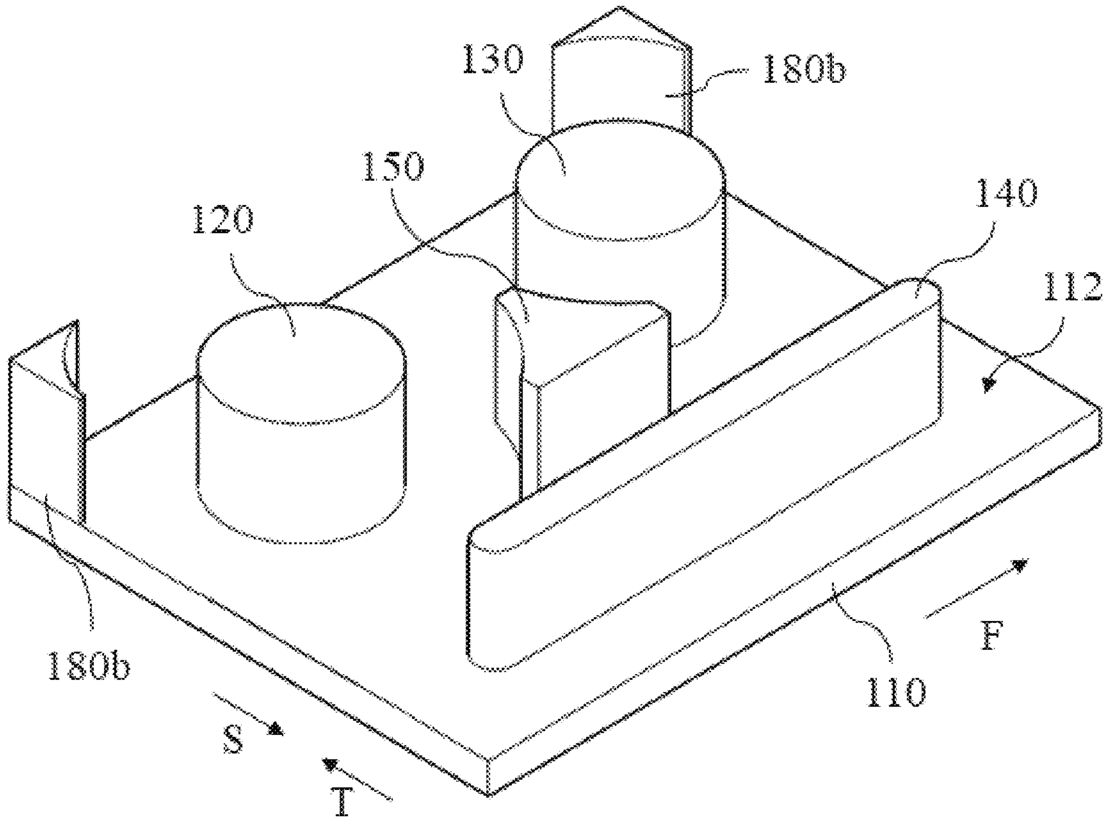
FIG. 7 is a perspective view of a magnetic core structure of a fourth embodiment of the present disclosure.

Please refer to FIG. 7, which is a perspective view of a magnetic core structure of a fourth embodiment of the present disclosure. The difference between the magnetic core structure 100 of FIG. 7 and the magnetic core structure 100 of FIG. 1 is that the magnetic core structure 100 of FIG. 7 may further comprise two second side columns 180*b*, which are disposed on the first surface 112 and mirror-symmetrically arranged on opposite ends of the bottom plate 110 along the first direction F. One second side column 180*b* may comprise one side wall facing the first transformer magnetic column 120 and two side walls aligned with adjacent sides of the bottom plate 110, and the other second side column 180*b* may comprise a side wall facing the second transformer magnetic column 13 and two side walls aligned with adjacent sides of the bottom plate 110. In addition, the line connecting the sectional centers of the two second side columns 180*b* may be parallel to the line connecting the sectional centers of the first transformer magnetic column 120 and the second transformer magnetic column 130.

Figure 8:
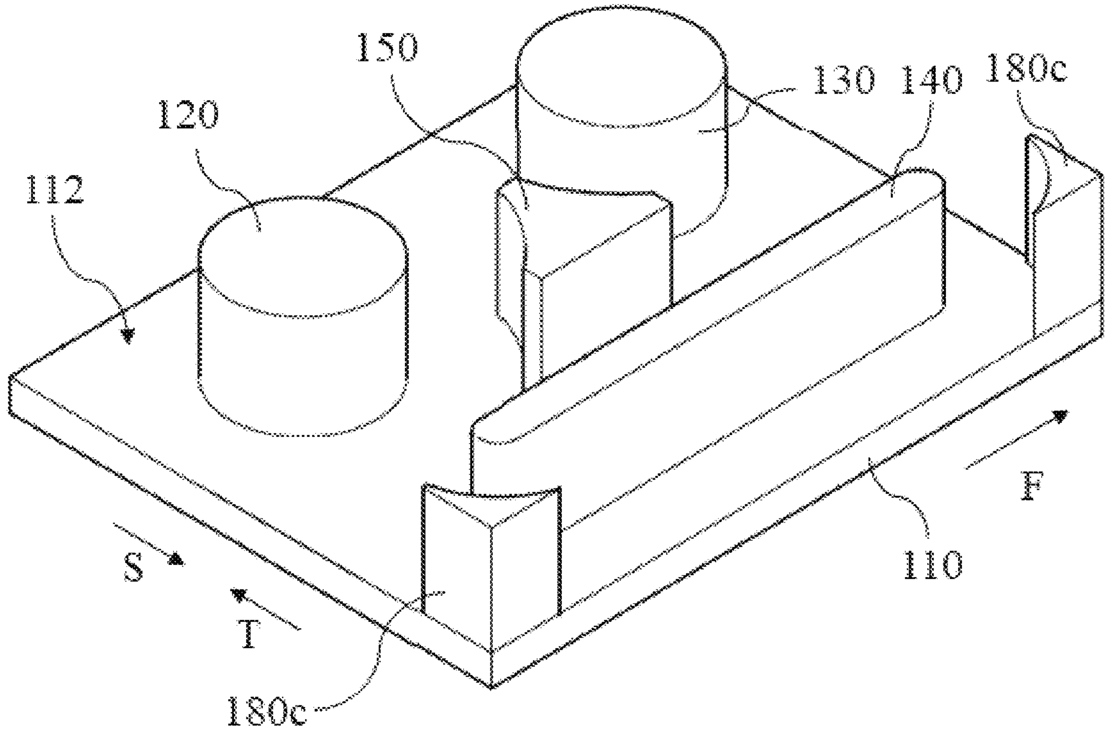
FIG. 8 is a perspective view of a magnetic core structure of a fifth embodiment of the present disclosure.

Please refer to FIG. 8, which is a perspective view of a magnetic core structure of a fifth embodiment of the present disclosure. The difference between the magnetic core structure 100 of FIG. 8 and the magnetic core structure 100 of FIG. 1 is that the magnetic core structure 100 of FIG. 8 may further comprise two second side columns 180*c*, which are disposed on the first surface 112 and mirror-symmetrically arranged on opposite ends of the bottom plate 110 along the first direction F. One second side column 180*c* may comprise a side wall facing the inductor magnetic column 140 and two side walls aligned with adjacent sides of the bottom plate 110, and the other second side column 180*c* may comprise one side wall facing the inductor magnetic column 140 and two side walls aligned with adjacent sides of the bottom plate 110. In addition, the line connecting the sectional centers of the two second side columns 180*c* may be parallel to the line connecting the section centers of the first transformer magnetic column 120 and the second transformer magnetic column 130.

Figure 9:
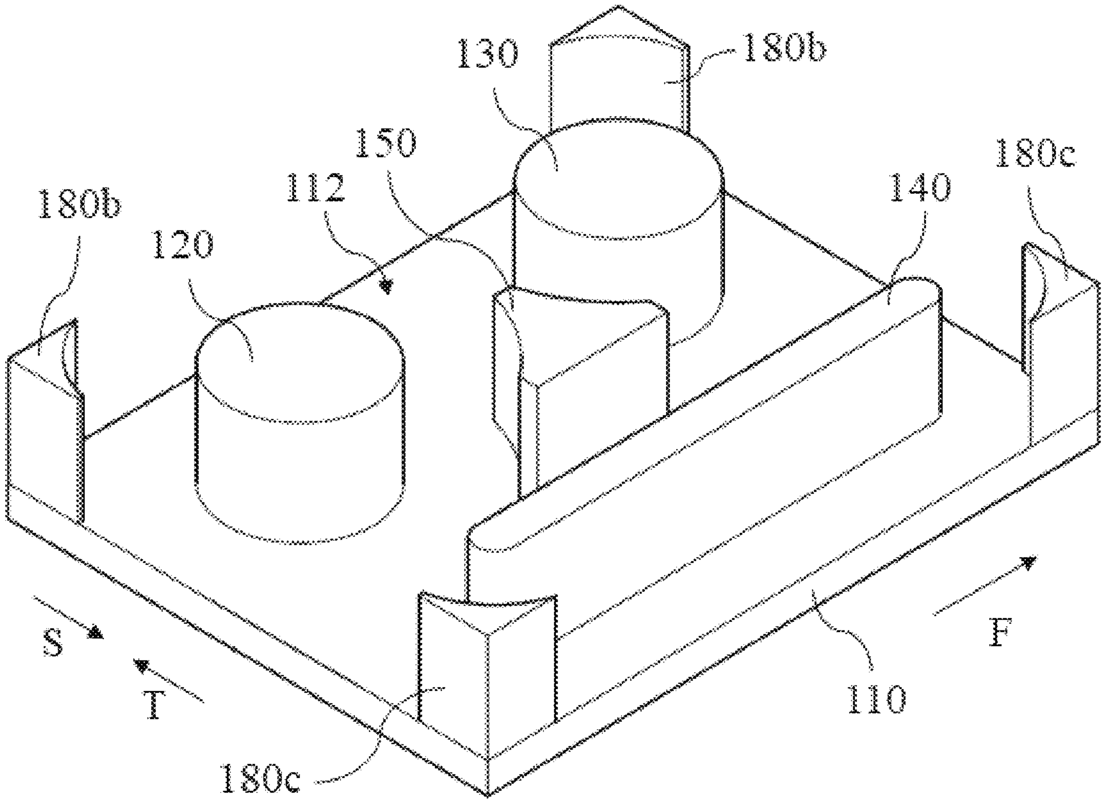
FIG. 9 is a perspective view of a magnetic core structure of a sixth embodiment of the present disclosure.
Figure 10:
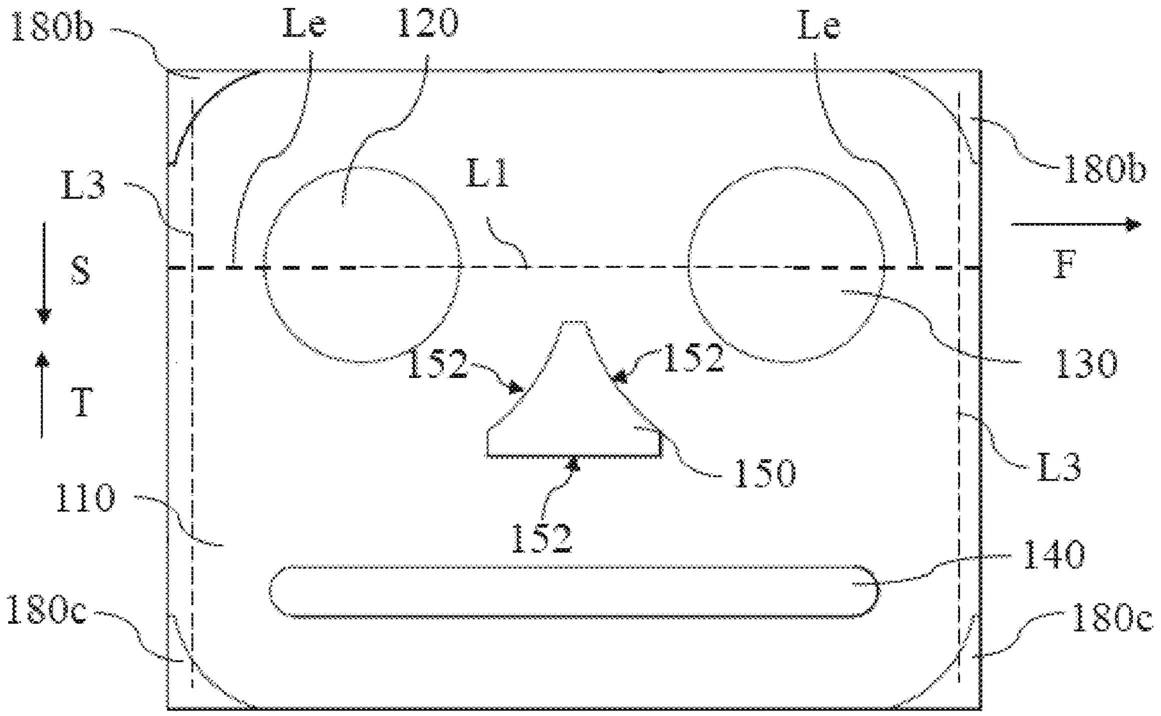
FIG. 10 is a top view of the magnetic core structure of FIG. 9.

Please refer to FIG. 9 and FIG. 10, wherein FIG. 9 is a perspective view of a magnetic core structure of a sixth embodiment of the present disclosure, and FIG. 10 is a top view of the magnetic core structure of FIG. 9. The difference between the magnetic core structure 100 of FIG. 9 and FIG. 10 and the magnetic core structure 100 of FIG. 7 is that the magnetic core structure 100 of FIG. 9 and FIG. 10 may further comprise two third side columns (i.e., the two second side columns 180*c* of FIG. 8). The two second side columns 180*c* are disposed on the first surface 112, the two second side columns 180*c* are mirror-symmetrically arranged on opposite ends of the bottom plate 110 along the first direction F, and the two second side columns 180*c* are spaced apart from the two second side columns 180*b* along the second direction S.

In one embodiment, the cross-sectional center line L3 connecting each second side column 180*b* and the third side column corresponding thereto (i.e., the second side column 180*c* in FIG. 8) spaced apart along the second direction S intersects with an extension line Le extending along the cross-sectional center line L1 connecting the first transformer magnetic column 120 and the second transformer magnetic column 130.

Figure 11:
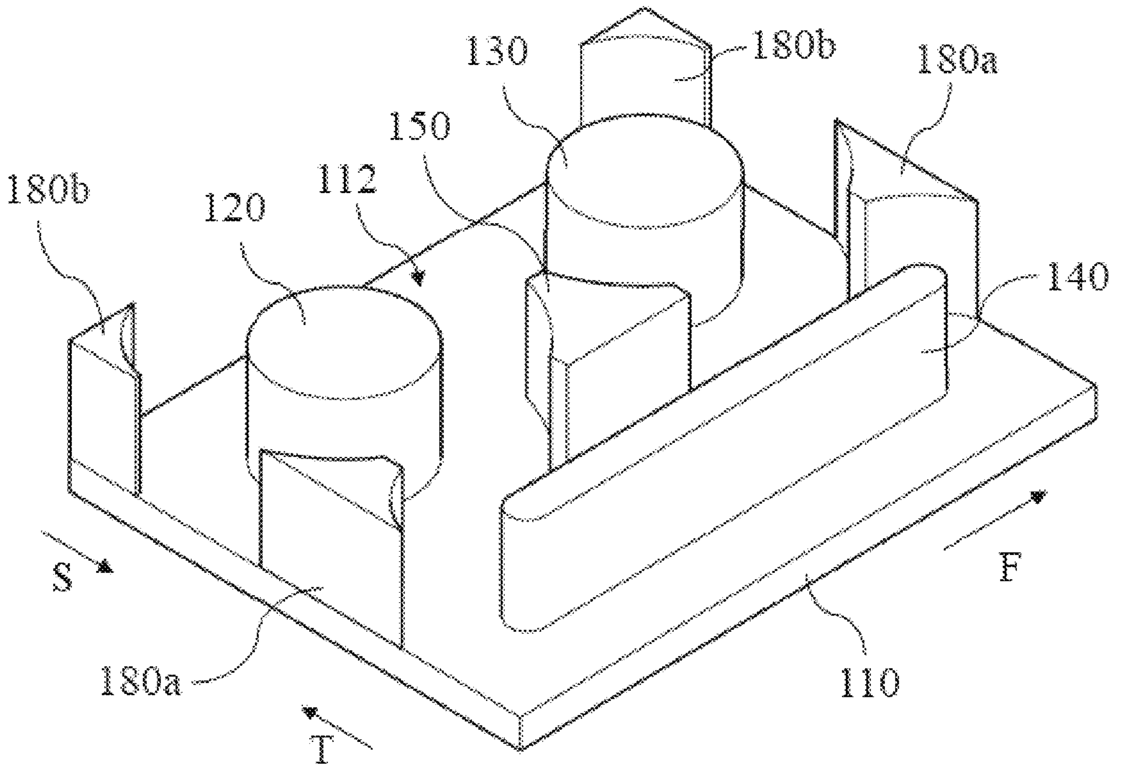
FIG. 11 is a perspective view of a magnetic core structure of a seventh embodiment of the present disclosure.

Please refer to FIG. 11, which is a perspective view of a magnetic core structure of a seventh embodiment of the present disclosure. The difference between the magnetic core structure 100 of FIG. 11 and the magnetic core structure 100 of FIG. 5 is that the magnetic core structure 100 of FIG. 11 may further comprise two third side columns (i.e., the two second side columns 180*b* of FIG. 7). The two second side columns 180*b* are disposed on the first surface 112. The two second side columns 180*b* are mirror-symmetrically arranged on opposite ends of the bottom plate 110 along the first direction F, and the two second side columns 180*b* are spaced apart from the two second side columns 180*a* along the second direction S. In addition, the cross-sectional center line connecting each second side column 180*a* and the third side column corresponding thereto (i.e., the second side column 180*b* in FIG. 7) spaced apart along the second direction S can intersect with an extension line extending along the line connecting the sectional centers of the first transformer magnetic column 120 and the second transformer magnetic column 130.

Figure 12:
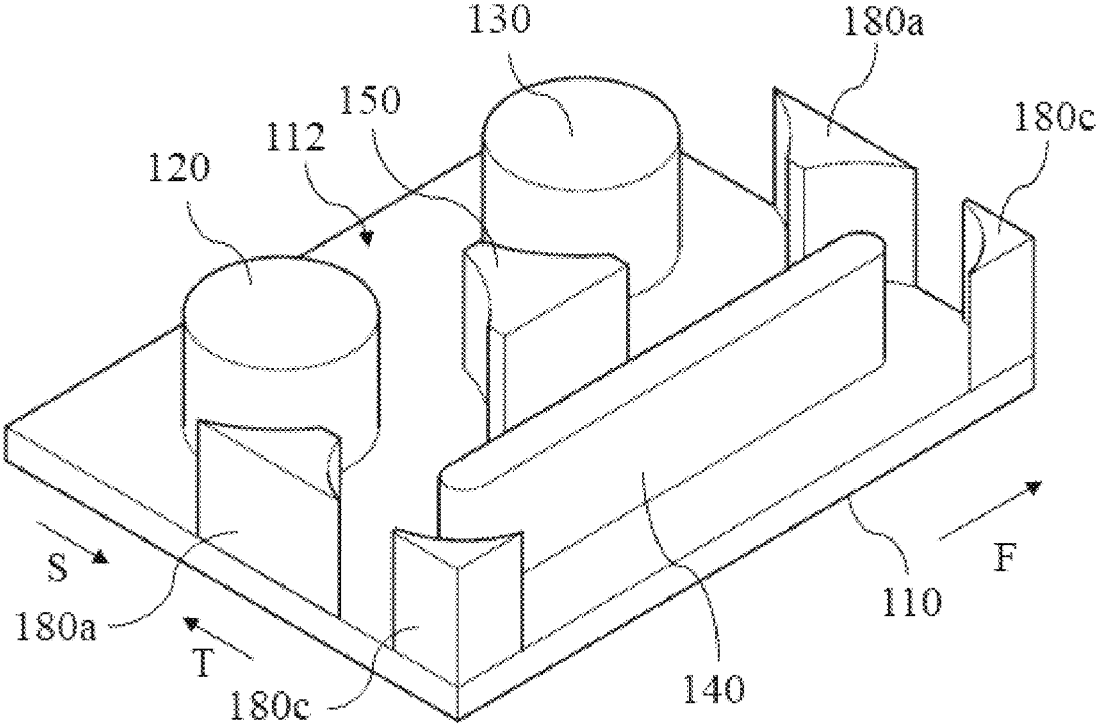
FIG. 12 is a perspective view of a magnetic core structure of an eighth embodiment of the present disclosure.

Please refer to FIG. 12, which is a perspective view of a magnetic core structure of an eighth embodiment of the present disclosure. The difference between the magnetic core structure 100 of FIG. 12 and the magnetic core structure 100 of FIG. 5 is that the magnetic core structure 100 of FIG. 12 may further comprise two third side columns (i.e., the two second side columns 180*c* of FIG. 8). The two second side columns 180*c* are disposed on the first surface 112. The two second side columns 180*c* are mirror-symmetrically arranged on opposite ends of the bottom plate 110 along the first direction F, and the two second side columns 180*c* are spaced apart from the two second side columns 180*a* along the second direction S. In addition, an extension line extending along the cross-sectional center line connecting each second side column 180*a* and the third side column corresponding thereto (i.e., the second side column 180*c* in FIG. 8) spaced apart along the second direction S can intersect with an extension line extending along the line connecting the cross-sectional centers of the first transformer magnetic column 120 and the second transformer magnetic column 130.

Figure 13:
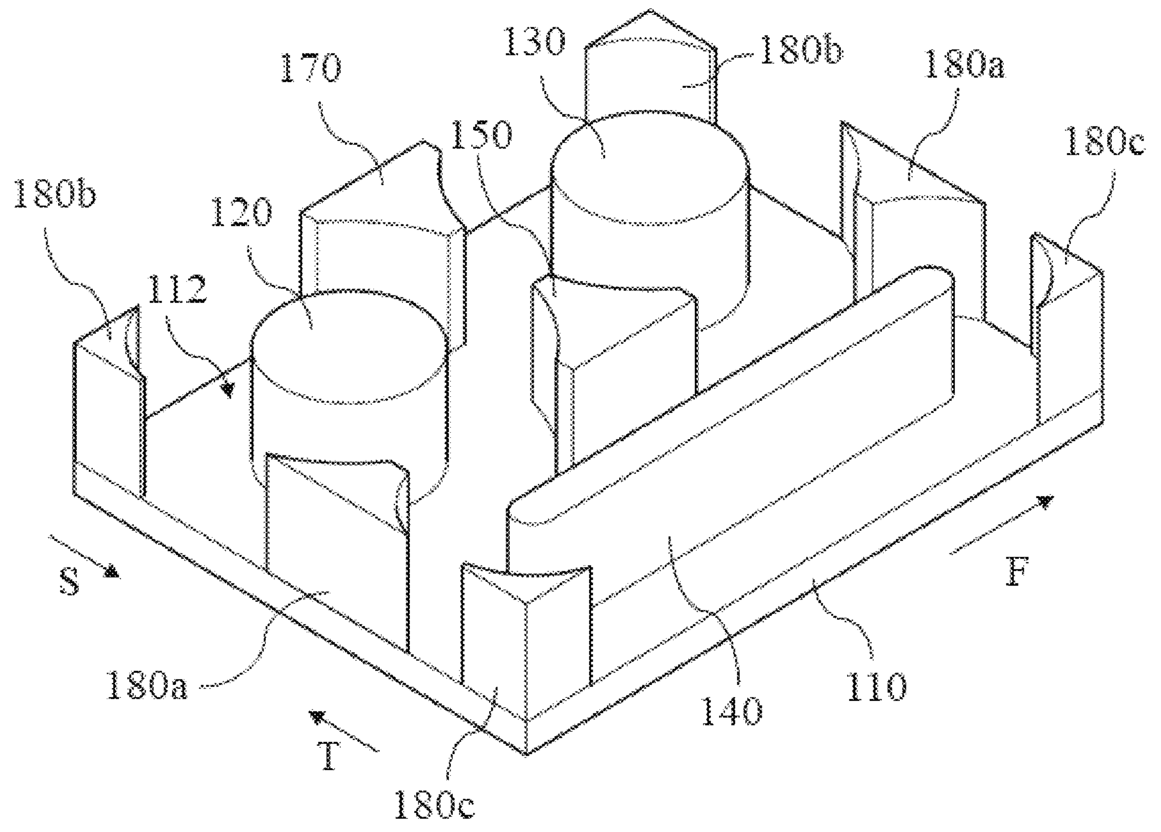
FIG. 13 is a perspective view of a magnetic core structure of a ninth embodiment of the present disclosure.

Please refer to FIG. 13, which is a perspective view of a magnetic core structure of a ninth embodiment of the present disclosure. As shown in FIG. 13, the magnetic core structure 100 may comprises two second side columns 180*a*, two second side columns 180*b*, and two second side columns 180*c*. The two second side columns 180*a*, two second side columns 180*b* and the two second side columns 180*c* are spaced apart along the second direction S.

Referring to FIG. 1, FIG. 14 and FIG. 15, the integrated magnetic component 200 comprises the inductor component 80 and the primary-side structure of the transformer 90, and is suitable for a resonant circuit 310 of a resonant converter 300. The resonant converter 300 may further comprise a square wave generating circuit 320 and a rectifier circuit 330 connected to the resonant circuit 310. The square wave generating circuit 320 comprises a plurality of switching elements 50, wherein the number of turns of the first transformer winding is the same as the number of turns of the second transformer winding 220, a sectional area of the first transformer magnetic column 120 is the same as a sectional area of the second transformer magnetic column 130, and the first transformer magnetic column 120 and the inductor magnetic column 140 have the following relationship:

$$\frac{X}{16} \leq \frac{A_{e_{tran}}}{A_{e_{Lr}}} \leq 2X,$$

wherein $$X = \frac{V_{in} \times N_{Lr}}{N_{tran} \times f_s \times L_r \times I_{Lr}},$$

a switching frequency of the square wave generating circuit 320 (that is, the frequency for switching the switching elements 50) is $f_s$, an inductance of this inductor element 80 is $L_r$, an input voltage of the square wave generating circuit 320 is $V_{in}$, the sectional area of the first transformer magnetic column 120 is $A_{e_{tran}}$, a sectional area of the inductor magnetic column 140 is $A_{e_{Lr}}$, the number of turns of the first transformer winding 210 is $N_{tran}$, the number of turns of the inductor winding 230 is $N_{Lr}$, and a current flowing through the inductor element 80 is $I_{Lr}$.

It should be noted that since the operation processes of the resonant circuit 310, the square wave generating circuit 320 and the rectifier circuit 330 in the resonant converter 300 are well known to those skilled in the art, no further details will be provided herein.

In summary, through the relative position arrangement of the first transformer magnetic column, the second transformer magnetic column, the inductor magnetic column and the first magnetic column on the first surface, and the structural design of the first magnetic column (that is, the first magnetic column includes three side walls facing the first transformer magnetic column, the second transformer magnetic column and the inductor magnetic column respectively), the magnetic cores of the inductor element and the transformer are integrated, so that the volume of the magnetic core structure of the present disclosure is smaller than that of the magnetic cores of the inductor element and the transformer arranged separately, which is in accordance with the current miniaturization development trend. In addition, when the magnetic core structure of the present disclosure is applied to an integrated magnetic component, the integrated magnetic component can integrate the functions of an inductor component and a transformer.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A magnetic core structure, comprising:

a bottom plate comprising a first surface;

a first transformer magnetic column disposed on the first surface;

a second transformer magnetic column disposed on the first surface and spaced apart from the first transformer magnetic column along a first direction;

an inductor magnetic column disposed on the first surface and spaced apart from the first transformer magnetic column and the second transformer magnetic column along a second direction perpendicular to the first direction; and a first magnetic column disposed on the first surface, located among the first transformer magnetic column, the second transformer magnetic column and the inductor magnetic column, and comprising three side walls facing the first transformer magnetic column, the second transformer magnetic column and the inductor magnetic column respectively.

2. The magnetic core structure according to claim 1, further comprising a first side column disposed on the first surface, wherein the first side column and the first magnetic column are arranged symmetrically with respect to a cross-sectional center line connecting the first transformer magnetic column and the second transformer magnetic column.

3. The magnetic core structure according to claim 1, further comprising two second side columns disposed on the first surface and mirror-symmetrically arranged on opposite ends of the bottom plate along the first direction.

4. The magnetic core structure according to claim 3, wherein a cross-sectional center line connecting the two second side columns is parallel to a cross-sectional center line connecting the first transformer magnetic column and the second transformer magnetic column.

5. The magnetic core structure according to claim 3, further comprising two third side columns disposed on the first surface, mirror-symmetrically arranged on opposite ends of the bottom plate along the first direction, and spaced apart from the two second side columns along the second direction.

6. The magnetic core structure according to claim 5, wherein a cross-sectional center line connecting each second side column and the third side column corresponding thereto spaced apart along the second direction intersects with an extension line extending along a cross-sectional center line connecting the first transformer magnetic column and the second transformer magnetic column.

7. The magnetic core structure according to claim 1, wherein a cross-sectional center line connecting the first transformer magnetic column and the second transformer magnetic column is parallel to a long axis direction of a section of the inductor magnetic column.

8. The magnetic core structure according to claim 7, wherein projection of the inductor magnetic column in a direction opposite to the second direction overlaps the first transformer magnetic column and the second transformer magnetic column.

9. The magnetic core structure according to claim 1, wherein a sectional area of the first transformer magnetic column is equal to a sectional area of the second transformer magnetic column; and a sectional area of the first magnetic column is greater than or equal to 0.1 times the sectional area of the first transformer magnetic column, and is less than or equal to 0.5 times the sectional area of the first transformer magnetic column.

10. The magnetic core structure according to claim 1, further comprising a cover plate;

wherein the first transformer magnetic column, the second transformer magnetic column, the inductor magnetic column and the first magnetic column are arranged between the bottom plate and the cover plate.

11. An integrated magnetic component, comprising:

the magnetic core structure according to claim 1;

a first transformer winding wound around the first transformer magnetic column;

a second transformer winding wound around the second transformer magnetic column; and an inductor winding wound around the inductor magnetic column;

wherein the first transformer magnetic column, the second transformer magnetic column, the first transformer winding and the second transformer winding constitute a primary side structure of a transformer, and the inductor magnetic column and the inductor winding constitute an inductor element.

12. The integrated magnetic component according to claim 11, wherein the integrated magnetic component is suitable for a resonant circuit of a resonant converter; the resonant converter further comprises a square wave generating circuit connected to the resonant circuit; the number of turns of the first transformer winding is the same as the number of turns of the second transformer winding; a sectional area of the first transformer magnetic column is the same as a sectional area of the second transformer magnetic column; and the first transformer magnetic column and the inductor magnetic column have the following relationship:

$$\frac{X}{16} \le \frac{A_{e_{tran}}}{A_{e_{Lr}}} \le 2X,$$

wherein $$X = \frac{V_{in} \times N_{Lr}}{N_{tran} \times f_s \times L_r \times I_{Lr}},$$

a switching frequency of the square wave generating circuit is $f_s$, an inductance of the inductor element is $L_r$, an input voltage of the square wave generating circuit is $V_{in}$, the sectional area of the first transformer magnetic column is $A_{e_{tran}}$, a sectional area of the inductor magnetic column is $A_{e_{Lr}}$, the number of turns of the first transformer winding is $N_{tran}$, the number of turns of the inductor winding is $N_{Lr}$, and a current flowing through the inductor element is $I_{Lr}$.

13. The integrated magnetic component according to claim 11, wherein a winding direction of the first transformer winding is opposite to a winding direction of the second transformer winding.

14. The integrated magnetic component according to claim 11, wherein a winding direction of the first transformer winding is the same as a winding direction of the second transformer winding, and a winding direction of the inductor winding is opposite to the winding direction of the second transformer winding.

15. The integrated magnetic component according to claim 11, wherein the magnetic core structure further comprises a first side column disposed on the first surface, and the first side column and the first magnetic column are arranged symmetrically with respect to a cross-sectional center line connecting the first transformer magnetic column and the second transformer magnetic column.

16. The integrated magnetic component according to claim 11, wherein the magnetic core structure further comprises two second side columns disposed on the first surface and mirror-symmetrically arranged on opposite ends of the bottom plate along the first direction.

17. The integrated magnetic component according to claim 16, wherein a cross-sectional center line connecting the two second side columns is parallel to a cross-sectional center line connecting the first transformer magnetic column and the second transformer magnetic column.

18. The integrated magnetic component according to claim 16, wherein the magnetic core structure further comprises two third side columns disposed on the first surface, mirror-symmetrically arranged on opposite ends of the bottom plate along the first direction, and spaced apart from the two second side columns along the second direction.

19. The integrated magnetic component according to claim 18, wherein a cross-sectional center line connecting each second side column and the third side column corresponding thereto spaced apart along the second direction intersects with an extension line extending along a cross-sectional center line connecting the first transformer magnetic column and the second transformer magnetic column.

20. The integrated magnetic component according to claim 11, wherein a cross-sectional center line connecting the first transformer magnetic column and the second transformer magnetic column is parallel to a long axis direction of a section of the inductor magnetic column.

* * * * *